(12) United States Patent
Kim

(10) Patent No.: US 7,387,047 B2
(45) Date of Patent: Jun. 17, 2008

(54) ELECTRONIC PEDAL DEVICE

(75) Inventor: Seong-Hak Kim, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 255 days.

(21) Appl. No.: 11/168,754

(22) Filed: Jun. 27, 2005

(65) Prior Publication Data

US 2006/0053949 A1    Mar. 16, 2006

(30) Foreign Application Priority Data

Jun. 25, 2004    (KR) .................... 10-2004-0048136

(51) Int. Cl.
G05G 1/14    (2006.01)
(52) U.S. Cl. .............................. 74/512; 74/513; 74/514; 74/560
(58) Field of Classification Search ........... 74/512–514, 74/560; 123/399; 192/75, 76; 188/78, 325, 188/334, 342; B62K 26/02
See application file for complete search history.

(56) References Cited

U.S. PATENT DOCUMENTS 6,860,170 B2 * 3/2005 DeForest .................... 74/512
7,073,408 B2 * 7/2006 Kim ............................ 74/513
2004/0237700 A1 * 12/2004 Wurn ........................... 74/514
2006/0179971 A1 * 8/2006 Peniston et al. ............... 74/560

FOREIGN PATENT DOCUMENTS

| JP | 2001-219759 |   | 8/2001 |
| JP | 2001-228927 | * | 8/2001 |
| JP | 2001-294058 | * | 10/2001 |
| JP | 2003-94979  | * | 4/2003 |
| WO | WO 2004/107079 A1 | * | 12/2004 |

* cited by examiner

Primary Examiner—Vinh T. Luong
(74) Attorney, Agent, or Firm—Morgan Lewis & Bockius LLP

(57) ABSTRACT

An electronic pedal device obtains a reliable and stable operation without generating noise by using a mechanism that converts a pivot of a treadle about a pedal body into a pivot of a link and then transmits the pivot of the link to a sensor. The device includes a base plate, pedal body, treadle, resilient member, sensor, and link.

3 Claims, 2 Drawing Sheets

ELECTRONIC PEDAL DEVICE

CROSS-REFERENCE TO RELATED APPLICATIONS

The present application is based on, and claims priority from, Korean Application Serial Number 10-2004-0048136, filed on Jun. 25, 2004, the disclosure of which is hereby incorporated by reference herein in its entirety.

FIELD OF THE INVENTION

The present invention relates to an electronic pedal device and, more particularly, to a device that converts a driver's pedal manipulation force into an electrical signal.

BACKGROUND OF THE INVENTION

When a driver depresses a pedal, an electronic pedal device generates an electrical signal according to the depressed angle of the pedal and transmits the signal into a device, thereby enabling to manipulate an acceleration device, brake device or the like without a mechanical connection.

The electronic pedal device should be reliable and stable in operation and have a restoring force against the driver's manipulation force.

SUMMARY OF THE INVENTION

Embodiments of the present invention are provided to have stabilization and reliance in operation of an electronic pedal device.

An electronic pedal device includes a base plate, and a pedal body secured to the base plate. A treadle is pivotably installed in relation to the pedal body. A resilient member is interposed between the pedal body and treadle. A sensor is secured to the treadle. A link is pivotably inserted at one end thereof to the sensor, and the other end of the link is pivotably inserted into the pedal body. The link shifts, by pivoting around the one end thereof inserted into the sensor, in response to the shift of the treadle in relation to the pedal body.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
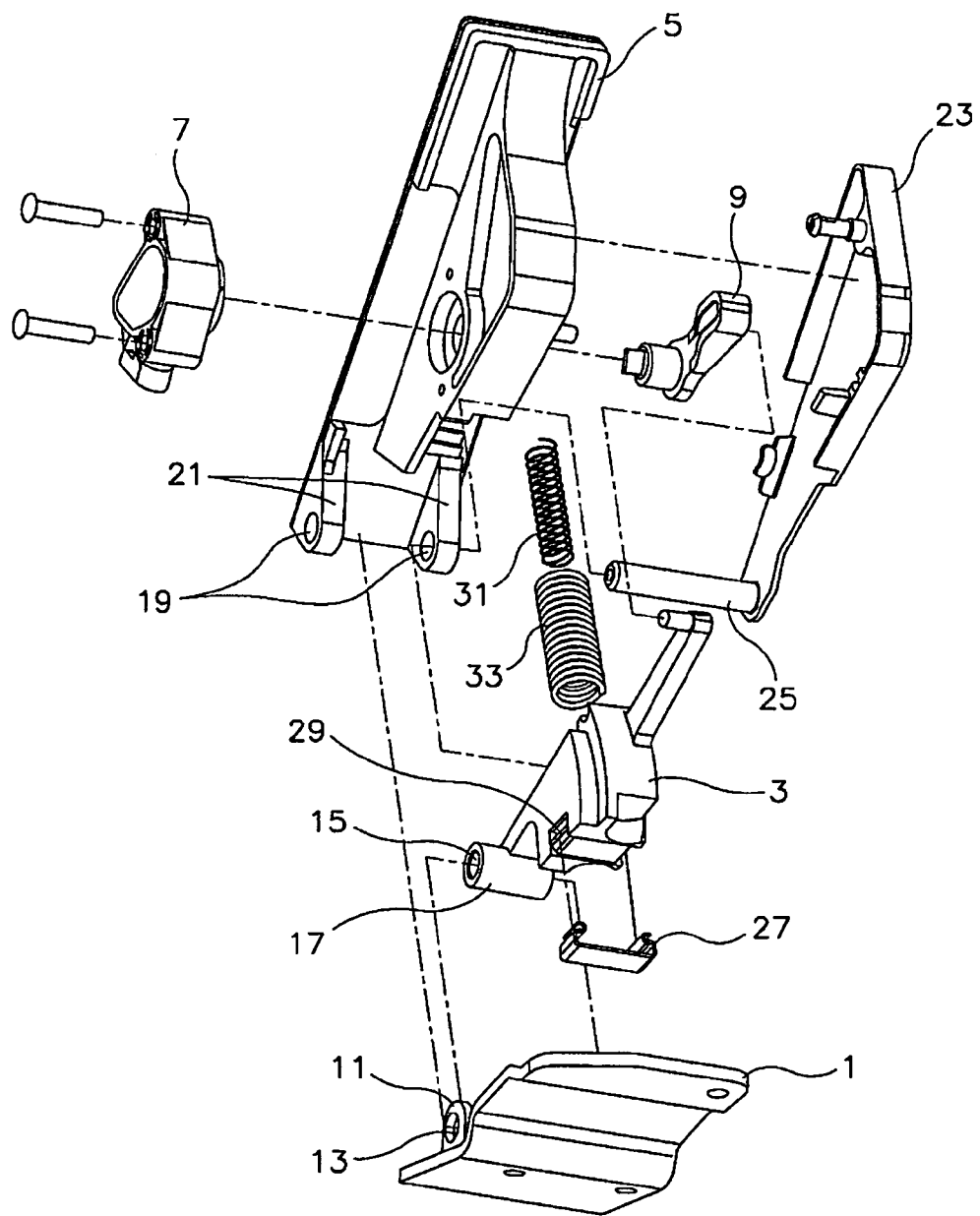
FIG. 1 is an exploded view of an electronic pedal device according to an embodiment of the present invention.
Figure 2:
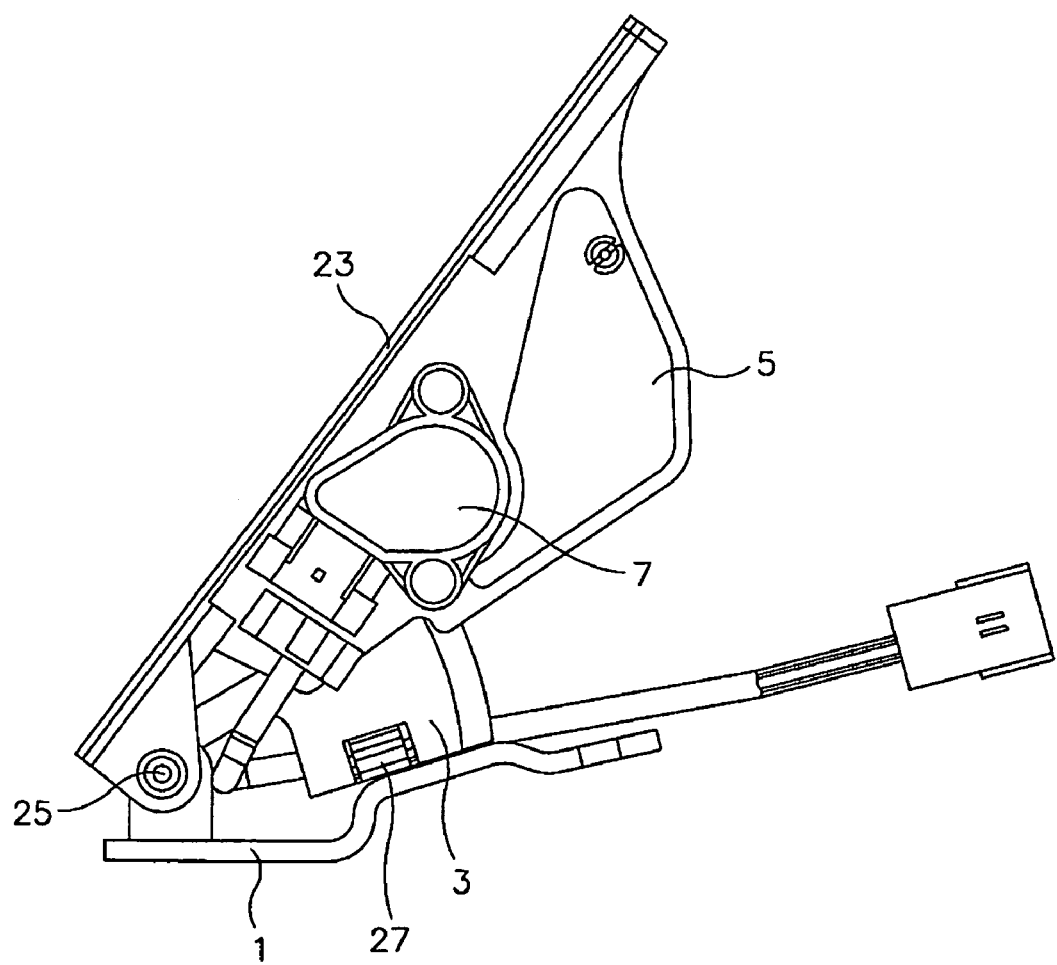
FIG. 2 is a side view of an assembled electronic pedal device according to an embodiment of the present invention.

An electronic pedal device according to an embodiment of the present invention is depicted in exploded view in FIG. 1. The device includes a base plate 1, and a pedal body 3 secured to base plate 1. A treadle 5 is pivotably installed in relation to pedal body 3. A resilient member is interposed between pedal body 3 and treadle 5. A sensor 7 is secured to treadle 5. A link 9 is pivotably inserted at one end thereof into sensor 7, and the other end of link 9 is pivotably inserted into pedal body 3.

Link 9 shifts, by pivoting around the one end thereof inserted into sensor 7, in response to the shift of treadle 5 in relation to pedal body 3.

Base plate 1 is formed with a curved portion 11, which is integrally and upwardly protruded in a curved shape from base plate 1 and has a first hole 13.

Pedal body 3 is formed with a hinge part 17 having a second hole 15 that is positioned to align with first hole 13.

Treadle 5 includes flanges 21 that have third holes 19 to align with first and second holes 13 and 15.

One surface of treadle 5 is attached with a shroud 23 to enclose the one surface of treadle 5. Shroud 23 is integrally equipped with a hinge pin 25, which penetrates first, second and third holes 13, 15 and 19.

When shroud 23 is coupled to one surface of treadle 5, treadle 5, pedal body 3, and base plate 1 are integrally secured together via hinge pin 25.

Thus, treadle 5, pedal body 3, and base plate 1 can pivot with each other by using hinge pin 25 as a shaft.

The upper surface of base plate 1 is attached with a spring clip 27, and pedal body 3 is formed with a coupling groove 29 to be coupled with spring clip 27.

Once coupling groove 29 of pedal body 3 is coupled with spring clip 27, pedal body 3 is fixed on base plate 1 and cannot pivot with respect to base plate 1.

The resilient member according to the embodiment of the present invention is composed of a first compression coil spring 31 and a second compression coil spring 33 inserted onto the outer circumference of first compression coil spring 31.

Base plate 1 is fixed on the floor of the vehicle body or the like and receives the driver's manipulation through treadle 5.

If the driver depresses treadle 5, treadle 5 relatively pivots with respect to pedal body 3 by using hinge pin 25 as a shaft.

Link 9 pivots corresponding to the pivot degree of treadle 5. The pivot degree of link 9 is detected by sensor 7, and sensor 7 generates an electrical signal, accordingly.

The signal from sensor 7 is transmitted to an acceleration device, brake device or the like to properly control the device.

If the driver alleviates the pressure of depressing treadle 5 or completely removes his or her foot from the pedal, treadle 5 is restored to its original position by the resilient force of first and second compression coil springs 31 and 33.

The electronic pedal device thus constructed can be substituted by an acceleration pedal, brake pedal, electronic game player or the like.

As apparent from the foregoing, there is an advantage in that an electronic pedal device can obtain a reliable and stable operation without generating noise by using a mechanism that converts pivot movement of the treadle about the pedal body into a pivot movement of the link and then inputs the pivot of the link into the sensor.

What is claimed is:

1. An electronic pedal device, comprising:
   a base plate;
   a pedal body fixed onto said base plate;
   a treadle pivotably installed in relation to said pedal body;
   a resilient member interposed between said pedal body and treadle;
   a sensor fastened to said treadle;
   a link pivotably inserted at one end thereof to said sensor while the other end of said link is pivotably inserted into said pedal body, and said link shifting, by pivoting around the one end thereof inserted into said sensor, in response to a shift of said treadle in relation to said pedal body;

a curved portion that is upwardly protruded in a curved shape from said base plate and has a first hole;

a hinge part that is formed at said pedal body and has a second hole positioned to align with said first hole;

flanges that are formed at said treadle and have third holes to align with said first and second holes; and a shroud coupled to said treadle for enclosing one surface of said treadle and integrally equipped with a hinge pin, which penetrates said first hole, second hole and third holes.

2. The device as defined in claim 1, further comprising:
a spring clip mounted on an upper surface of said base plate; and
a coupling groove formed at said pedal body to be coupled with said spring clip.

3. The device as defined in claim 1, wherein said resilient member includes:
a first compression coil spring; and
a second compression coil spring that is inserted onto an outer circumference of said first compression coil spring.

* * * * *